Figure 1:
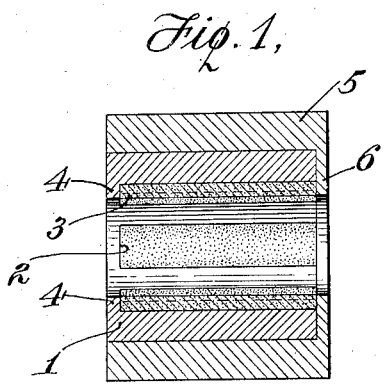

G. H. WORRALL.
BEARING.
APPLICATION FILED JUNE 12, 1919.

1,339,084.

Patented May 4, 1920.

Inventor
George H. Worrall
By Attorney

UNITED STATES PATENT OFFICE.

GEORGE H. WORRALL, OF KIRKWOOD, MISSOURI, ASSIGNOR TO UNITED LEAD COMPANY, OF NEW YORK, N. Y., A CORPORATION OF NEW JERSEY.

BEARING.

1,339,084.   Specification of Letters Patent.   Patented May 4, 1920.

Application filed June 12, 1919. Serial No. 303,558.

*To all whom it may concern:*

Be it known that I, GEORGE H. WORRALL, United States citizen, residing at Kirkwood, Missouri, have invented the following-described Improvements in Bearings.

The invention consists in the structure and method of making of so-called self-lubricating or oilless bearings wherein the body or shell of the bearing is formed with grooves or spaces holding graphite paste or similar lubricating compound. The object is to reduce the cost of production of such bearings by providing for their manufacture in ordinary die-casting machines. The general principle and necessary detail of the invention are made apparent in the following description.

In the drawings:

Figure 1 is an axial section of a bearing incorporating the invention in its form now preferred.

Figure 2:
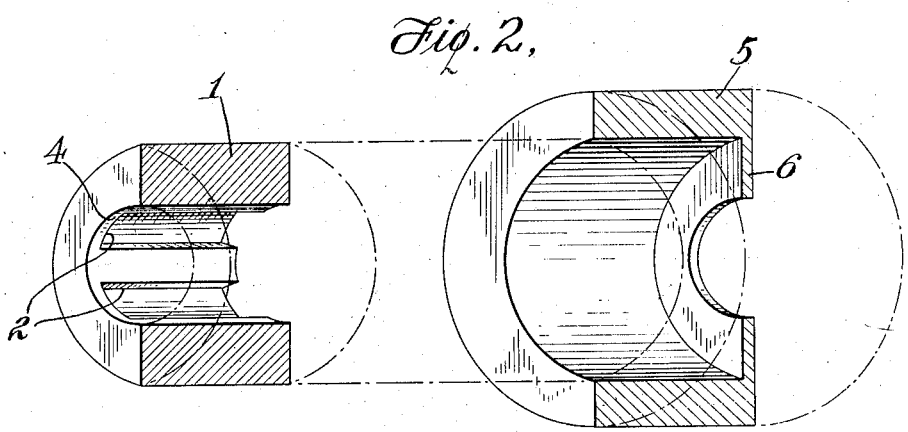

Fig. 2, a separated diagram of the two parts of this bearing illustrating their mutual relation before assemblage.

Figure 3:
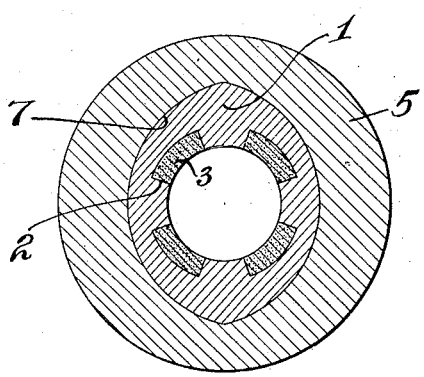

Fig. 3, a cross section of said bearing assembled and

Figure 4:
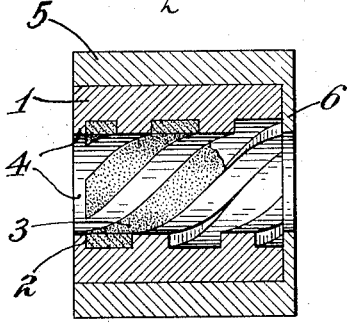

Fig. 4, an axial section of a bearing with spiral grooves.

One of the elements of the bearing, indicated by 1 in Figs. 1 to 3, is formed with one or more longitudinal grooves 2 for holding a solid or semi-solid lubricating compound indicated by 3. These longitudinal grooves are closed at one end by the shroud wall 4 formed integral with the body of the element and they are open at their opposite ends and of uniform cross sectional shape and area from end to end, or of progressively larger shape toward their open ends, so that the element 1 can be cast in a simple mold or die and withdrawn from it without disassembling such die or mold or impairing it for further repeated use. The grooves are also, preferably, under-cut in order to hold the lubricant material securely. To this cast element of the bearing, there is permanently fixed a complemental element 5 carrying a flange 6 which closes the open ends of the lubricant grooves. The said flange is the principal part of this element and its function is to form an end-wall for each groove in the other element, similar to the wall 4 thereof and like that wall flush with the bearing surface of the bearing so that the body of lubricant material therein will be protected and supported on all four sides. Such material has but little cohesion and by the means just described is adequately held in place so that it will maintain proper contact with the shaft or the part journaled upon the bearing without danger of crumbling or falling away. This wall-forming element 5 may be of various forms and shapes and may be related to the main groove-containing element in different ways so long as it can be permanently fixed in groove-closing and lubricant-protecting position thereon and thus coöperate to form inclosing pockets for the lubricant as stated. In the case in hand it forms the larger part of the bearing being provided with an internal cavity 7, the cross-sectional contour of which is oblate or non-circular corresponding to the external contour of the bearing element 1 and of substantially the same size as said element so that the latter can be pressed into it as indicated in Fig. 1 and thereby become permanently united to it forming a practically integral structure in all respects equivalent to the common bearings of this class in which the lubricant grooves are formed complete by a single casting operation.

The element 5 can also be cast in simple die-casting machinery and both elements are made of any suitable bearing metal, such for example as lead with a small amount of barium and calcium added to it. When the parts are properly related as to size and shape the pressing of one into or upon the other results in a firm frictional attachment, approximating an autogenous weld, which constitutes the resulting structure as the full equivalent of a one piece casting. The section of the inner element and the cavity 7 are, however, made non-circular in order to avoid any possibility of rotative motion between them at any stage. After assembly, the grooves are filled with the lubricant material in the usual way and generally flush with the metallic bearing surface of the element.

In Fig. 4 the structure and mode of manufacture are the same except that the lubricant-grooves are here of spiral form, the ends thereof being closed at one end of the bearing by the integral walls 4 and at the other end of the bearing by the walls 6 applied after the element 1 has been cast, both end-walls forming part of the bearing surface. Such spiral grooves, open at one end, enable the element to be removed from the casting-die quite as readily as the straight grooved form.

In both forms described and in any form of the invention, the metallic part of the bearing can be made with greater rapidity and at less cost than is possible where the grooves are cast with both end walls in position and individual sand cores or other casting appliances have to be first set in position and subsequently removed from grooves. The process of closing the open groove-ends is readily done automatically and may, if desired, be combined with the groove filling process in further simplification of the manufacturing system. The manufacturer will appreciate that the shape of the bearing may be varied extensively to suit requirements and that there is no limitation to the invention in this respect nor in respect to the shape, form or design of the individual elements or parts of the structure.

Claims:

1. A bearing comprising a metallic element formed with one or more grooves extending from end to end thereof for holding a lubricating compound, each groove being open at one end and thereby adapting said member to be cast in and withdrawn from a die or mold without disassembling or destroying the latter and having a metallic wall element applied to and permanently fixed in position upon it after casting, closing the open end or ends of said groove or grooves, and a solid lubricating material held in said groove or grooves, substantially flush with the end walls thereof and protected by said end walls.

2. The bearing of claim 1 wherein the wall-forming element is pressed into permanent frictional contact with the groove-and-lubricant-containing element.

3. The bearing of claims 1 and 2 wherein the said wall-forming element receives and surrounds the other element forming the outer surface of the completed bearing.

4. A bearing comprising a grooved element, the groove or grooves whereof are open at one end of the element, a wall-forming element closing said grooves, the two said elements having non-circular cross-sectional portions mutually and permanently affixed to each other and a lubricating material contained in said grooves.

5. A bearing formed of a bearing metal with lubricant-holding grooves in its bearing surface and comprising two permanently united metallic elements each carrying one end closure to the said grooves.

6. The method of making metallic bearings having grooves containing solid lubricant, which consists in casting an element of the bearing with lubricant grooves therein closed at one end and open at the other, thereafter mechanically fixing a closure element to the open ends of said grooves, and then filling said grooves with a solid lubricant material.

In testimony whereof, I have signed this specification.

GEORGE H. WORRALL.